(12) United States Patent
Gingras (10) Patent No.: US 8,882,123 B1
(45) Date of Patent: Nov. 11, 2014

(54) TOW HITCH FOR BICYCLE

(76) Inventor: Douglas M. Gingras, Grand Blanc, MI (US)

(*) Notice: Subject to any disclaimer, the term of this patent is extended or adjusted under 35 U.S.C. 154(b) by 15 days.

(21) Appl. No.: 13/591,582

(22) Filed: Aug. 22, 2012

(51) Int. Cl.
 B62K 13/02 (2006.01)
 B62K 27/00 (2006.01)
 B62K 27/12 (2006.01)

(52) U.S. Cl.
 CPC .................................... B62K 27/12 (2013.01)
 USPC ............ 280/204; 280/231; 280/292; 280/402

(58) Field of Classification Search
 CPC ........................................................ B62K 27/12
 USPC .............. 280/202, 204, 288.4, 292, 293, 295, 280/304, 304.5, 495; 224/426, 425, 419, 224/422, 429, 447, 449, 450
 See application file for complete search history.

(56) References Cited

U.S. PATENT DOCUMENTS

| 4,721,320 | A |   | 1/1988 | Creps et al. |
| 5,842,710 | A | * | 12/1998 | Couture ........................ 280/204 |
| 6,050,581 | A |   | 4/2000 | Everett |
| 6,099,011 | A |   | 8/2000 | Beaudoin et al. |
| 6,481,735 | B1 |  | 11/2002 | Hilk |
| 6,749,212 | B2 |  | 6/2004 | Mock et al. |
| 2003/0080534 | A1 |  | 5/2003 | Freeman |
| 2012/0205892 | A1 | * | 8/2012 | Peruzzo ........................ 280/292 |

OTHER PUBLICATIONS

Trailgator. Target.com. http://www.google.com/products/catalog?q=bike+tow+hitch&um=1&hl=en&biw=1440&bih=805&ie=UTF-8&tbm=shop&cid=12169351759303929697&sa=X&ei=fhG8ToeoCcj10gGO7eDfCQ&ved=0CJQBEPMCMAE.
Accessories Bike Tow Bar|Tow Hitch. http://www.bandicoots.com/au/Motorcycletrailers/ACCESSORIES/Biketowhitch.aspx.

* cited by examiner

*Primary Examiner* — Joseph M Rocca
*Assistant Examiner* — Jacob Knutson
(74) *Attorney, Agent, or Firm* — Robert C. Montgomery; Montgomery Patent & Design (57) ABSTRACT

A bicycle tow hitch comprises an apparatus to enable a master bicycle to tow a slave bicycle behind it. The apparatus comprises a plurality of tubular members which make up a master unit and a slave unit being joined using a plurality of bolts. The slave unit is installed onto the front wheel of the slave bicycle and prevents the front wheel of the slave bicycle from rotating. The master unit is installed onto the rear portion of the master bicycle and supports the slave unit in a way that suspends the front wheel of the slave bicycle above the ground while leaving the rear wheel of the slave bicycle in contact with the ground.

14 Claims, 7 Drawing Sheets

TOW HITCH FOR BICYCLE

RELATED APPLICATIONS

Not Applicable.

FIELD OF THE INVENTION

This disclosure relates to tow hitches and, more particularly, to a bicycle tow hitch that enable a master bicycle to tow a slave bicycle behind it.

BACKGROUND OF THE INVENTION

Modern concerns over health and physical fitness have produced an abundance of people who religiously participate in a variety of exercise regimens in order to stay in shape. One (1) of the most popular exercise activities involves bicycle riding. However, with the typical bicycle being a "one" rider machine, problems and logistical difficulties quickly arise when using a bike to pick someone up or dropping someone off at a specific location while using a bicycle. One can have someone transport two (2) bicycles in a truck or other motor vehicle, but such a solution quickly defeats the purposes of exercise and energy savings provided by a bicycle. One can ride a bike while attempting to hold the other one alongside, but such a solution greatly compromises their safety as well as any other motorists or pedestrians who happen to be nearby. Accordingly, there exists a need for a means by which a rider-less bicycle can be easily transported by another bike rider to another location.

There have been attempts in the past to provide such a means to tow a bicycle behind a master bicycle. U.S. Pat. App. Pub. No. 2003/0080534 in the name of Freeman discloses an elongated apparatus attached to the bicycle seat frame for pulling a trailer device. Unfortunately, the Freeman apparatus doesn't support the front frame of the towed bicycle and does not fall under the scope of the present invention.

U.S. Pat. No. 4,721,320 issued in the name of Creps et al. discloses an bicycle trailer hitch attached to the point between the seat stay and the chain stay of the master bicycle. The Creps et al. device also comprising a pivoting mechanism to provide attachment to the bicycle. This method has multiple moving parts and is much more complicated than the present invention.

U.S. Pat. No. 6,099,011 issued in the name of Beaudoin et al. discloses a bicycle trailer hitch attaching a bicycle trailer to a rear frame of a bicycle, particular at the seat stay and chain stay. The Beaudoin et al. Further comprises a flexible connecting means which does not fall under the scope of the present invention.

U.S. Pat. No. 6,749,212 issued in the name of Mock et al. discloses a bicycle trailer hitch or accessory mount using a trailer tongue with a rotatable pin. The Mock et all device does disclose a device that supports a front frame of a towed bicycle.

SUMMARY OF THE INVENTION

Therefore, it is an object of the present invention to provide a tow hitch for a bicycle to enable a master bicycle to tow a slave bicycle.

An aspect of the invention is to provide such a hitch having a master unit adapted to be attached to the master bicycle and a slave unit attached to the master unit.

The slave unit is adapted to be attached to the slave bicycle and the slave unit remains statically anchored to the master unit during transport of the slave bicycle.

An aspect of the invention is to provide such a master unit comprising a central frame support bar including a central frame front aperture, a central frame central aperture, and a plurality of central frame rear apertures; a left fork support bar including a left fork upper aperture and a left fork lower aperture; a central upright bar including a central upright right aperture, a central upright central aperture, and a central upright left aperture; a right upright bar including a right upright upper aperture and a right upright lower aperture; and, a left upright bar including a left upright upper aperture and a left upright lower aperture.

Another aspect of the invention is to provide such a slave unit comprising a right fork support bar capable of receiving a front wheel of the slave bicycle; a lower fork clamp bar including a loop receptacle, a lower fork clamp left aperture, a plurality of lower fork clamp central apertures, and a lower fork clamp right aperture; an upper fork clamp bar including an upper fork clamp aperture and a fork clamp retaining bolt including a threaded end and a handle.

Yet another aspect of the invention is wherein the lower fork clamp bar is adapted to be inserted through the front wheel and behind a wheel fork of the slave bicycle so that the loop receptacle is adapted to be positioned on a left side of the slave bicycle, the upper fork clamp bar is adapted to be inserted through the front wheel in front of the wheel fork of the slave bicycle and secured by the loop receptacle, and wherein the threaded end of said fork clamp retaining bolt attaches the right fork upper aperture to the upper fork clamp aperture and the lower fork clamp right receptacle.

Yet another aspect of the invention is where the right upright lower aperture is removably connected to the right fork lower aperture and the right receptacle, the left fork upper aperture is attached to the lower fork clamp left aperture, and the central frame rear apertures are attached to the lower fork clamp central apertures, respectively.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 bicycle tow hitch
20 master unit
21 slave unit
30 central frame support bar
31 central frame front aperture
32 central frame central aperture
33 central frame rear aperture
50 left fork support bar
51 left fork upper aperture
52 left fork lower aperture
60 central upright bar
61 central upright right aperture
62 central upright central aperture
63 central upright left aperture
70 right upright bar
71 right upright upper aperture
72 right upright lower aperture
80 left upright bar
81 left upright upper aperture
82 left upright lower aperture
90 right fork support bar
91 right fork upper aperture
92 right fork lower aperture
100 lower fork clamp bar
101 loop receptacle
102 lower fork clamp left aperture
103 lower fork clamp central aperture
105 lower fork clamp right aperture
110 upper fork clamp bar
111 upper fork clamp aperture
120 fork clamp retaining bolt
121 threaded end
122 handle
130 bolt
140 master bicycle
141 seat post aperture
142 frame fender bracket
143 right receptacle
145 left receptacle
150 slave bicycle
151 front wheel
153 wheel fork
154 rear wheel

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
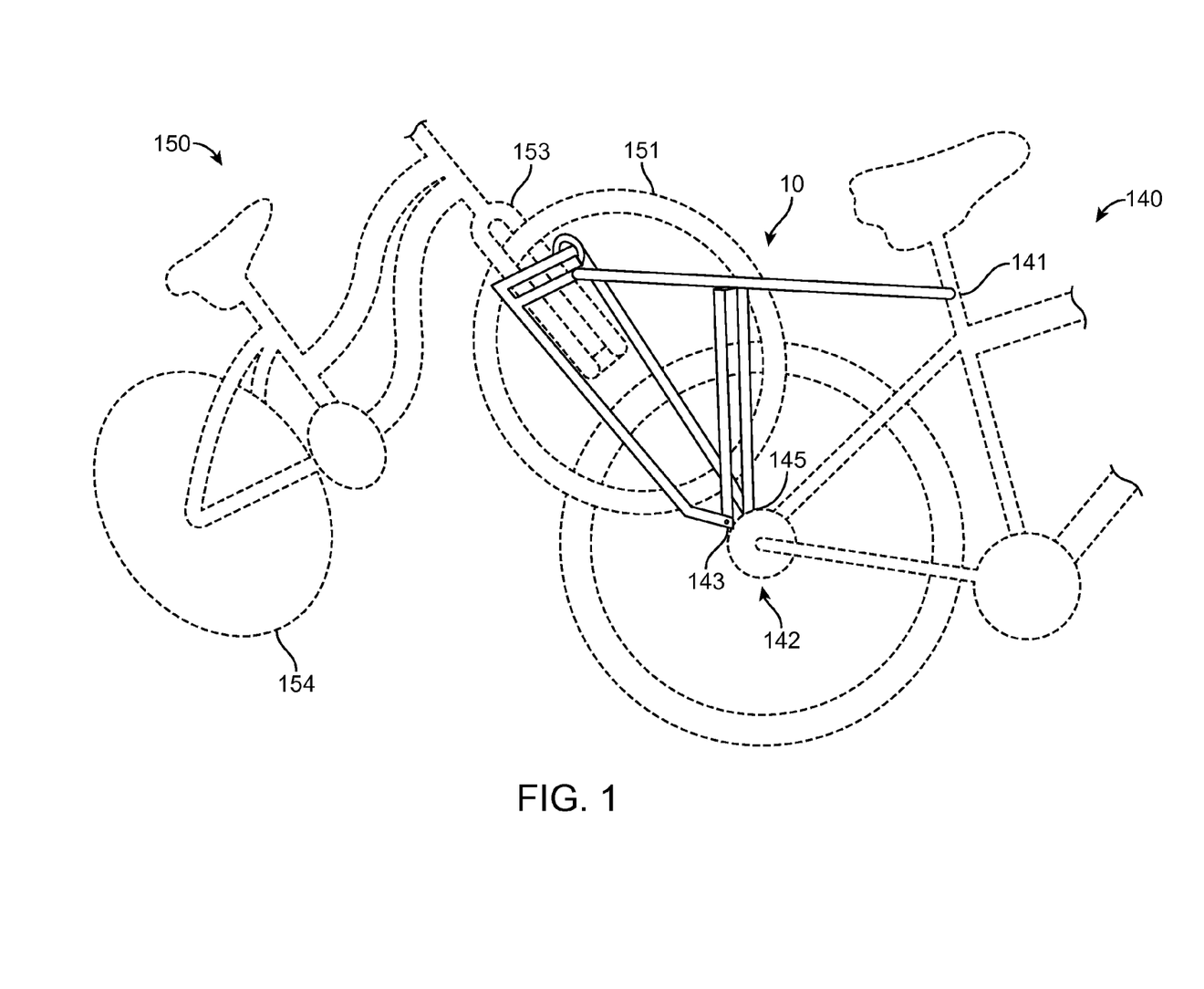
FIG. 1 is a perspective view of a bicycle tow hitch 10 installed on a master bicycle 140 and a slave bicycle 150, according to a preferred embodiment of the present invention.

Referring now to FIG. 1, the present invention describes a bicycle tow hitch (herein described as the "apparatus") 10, which provides a means for a master bicycle 140 to securely tow a slave bicycle 150. The master bicycle 140 comprises a seat post aperture 141 and a frame fender bracket 142. The frame fender bracket comprises a right receptacle 143 and a left receptacle 145. The slave bicycle 150 comprises a front wheel 151, a rear wheel 154, and a wheel fork 153.

Once installed, the apparatus 10 supports the front wheel 151 of the slave bicycle 150 so that the front wheel 151 is suspended above the ground and prevented from rotating. In this way, the rear wheel 154 of the slave bicycle 151 remains in contact with the ground and allows the master bicycle 140 to safely and securely tow the slave bicycle 150.

Figure 2:
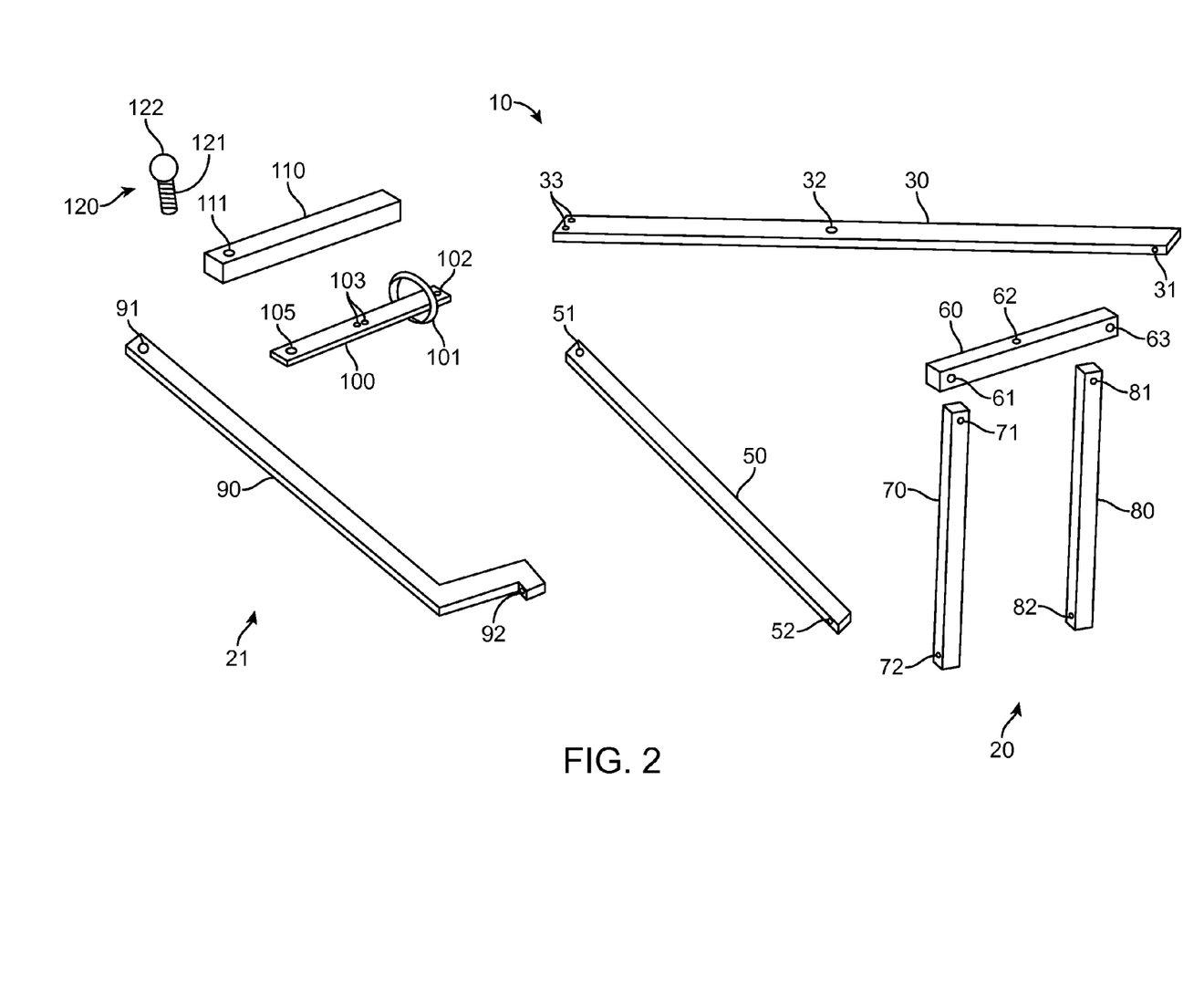
FIG. 2 is an exploded perspective view of the bicycle tow hitch 10, according to a preferred embodiment of the present invention.

Referring now to FIG. 2, an exploded perspective view of the apparatus 10, according to the preferred embodiment of the present invention, is disclosed. The apparatus 10 comprises a master unit 20, a slave unit 21, and a plurality of bolts 130. The apparatus is primarily composed of a sturdy material, such as steel, that has been coated with a corrosion preventing material.

The master unit 20 comprises a central frame support bar 30, a left fork support bar 50, a central upright bar 60, a right upright bar 70, and a left upright bar 80. The central frame support bar 30 comprises a central frame front aperture 31, a central frame central aperture 32, and two (2) central frame rear apertures 33. The left fork support bar 50 comprises a left fork upper aperture 51 and a left fork lower aperture 52. The central upright bar 60 comprises a central upright right aperture 61, a central upright central aperture 62, and a central upright left aperture 63. The right upright bar 70 comprises a right upright upper aperture 71 and a right upright lower aperture 72. The left upright bar 80 comprises a left upright upper aperture 81 and a left upright lower aperture 82.

The slave unit 21 comprises a right fork support bar 90, a lower fork clamp bar 100, an upper fork clamp bar 110, and a fork clamp retaining bolt 120. The right fork support bar 90 is shaped to receive the front wheel 151 of the slave bicycle 150 and comprises a body with three (3) portions: a first section, a second section angled toward a first side extending from an end of the first section, and a third section extending outwardly from an end of the second section generally parallel to the first section. The right fork support bar 90 further comprises a right fork upper aperture 91 and a right fork lower aperture 92. The lower fork clamp bar 100 comprises a loop receptacle 101, a lower fork clamp left aperture 102, two (2) lower fork clamp central apertures 103, and a lower fork clamp right aperture 105. The upper fork clamp bar 110 comprises an upper fork clamp aperture 111. The fork clamp retaining bolt 120 comprises a threaded end 121 and a handle 122.

Figure 3:
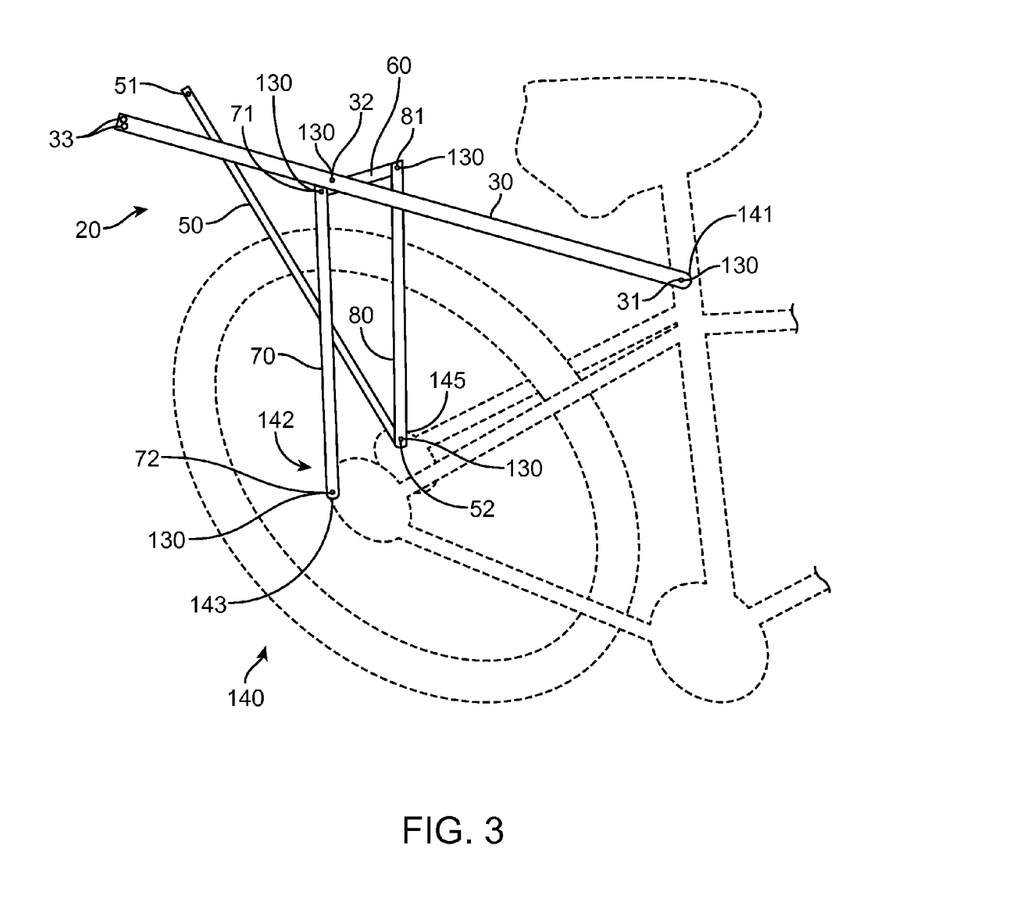
FIG. 3 is a perspective view of a master unit 20 of the bicycle tow hitch 10 installed on the master bicycle 140, according to a preferred embodiment of the present invention.
Figure 4:
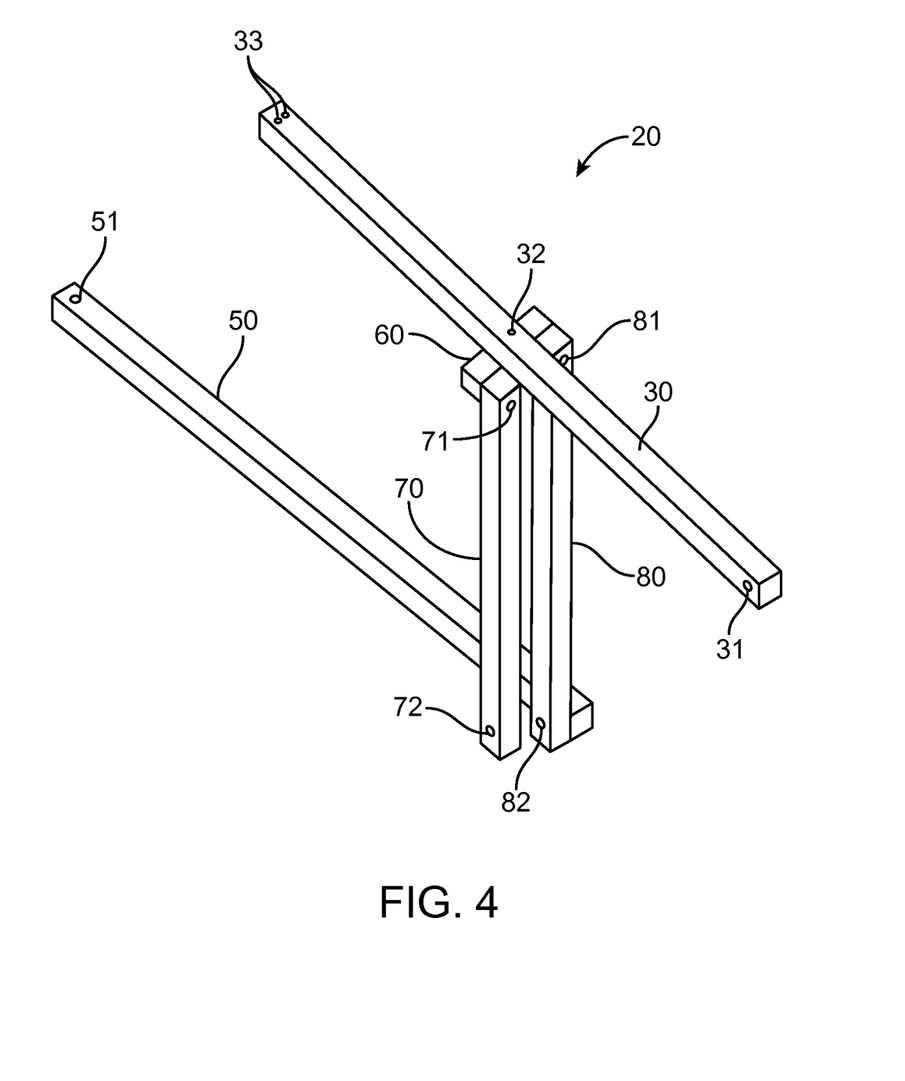
FIG. 4 is a perspective view of the master unit 20 of the bicycle tow hitch 10, according to a preferred embodiment of the present invention.

Referring now to FIGS. 3 and 4, perspective views of the master unit 20 of the apparatus 10 both installed on the master bicycle 140 and without the master bicycle 140, according to the preferred embodiment of the present invention, are disclosed. The central frame front aperture 31 of the central frame support bar 30 is adapted to attach to the seat post aperture 141 of the master bicycle 140 with a bolt 130. The central frame central aperture 32 attaches to the central upright central aperture 62 with a bolt 130. A bolt 130 connects the right fork lower aperture 92, the right upright lower aperture 72, and the right receptacle 143 in that order (please see FIG. 7). The right upright upper aperture 71 attaches to the central upright right aperture 61 with a bolt 130. The left upright upper aperture 81 attaches the central upright left aperture 63 with a bolt. A bolt 130 connects the left fork lower aperture 52, the left upright lower aperture 82, and the left receptacle 145 in that order.

Figure 5:
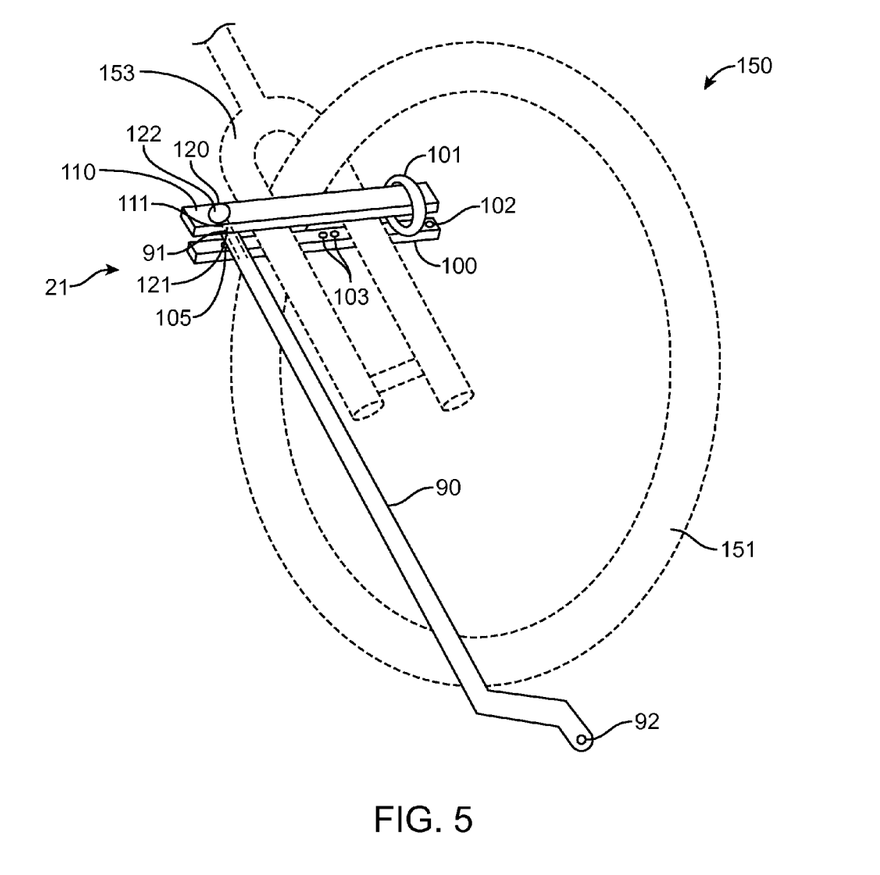
FIG. 5 is a perspective view of a slave unit 21 of the bicycle tow hitch 10 installed on the slave bicycle 150, according to a preferred embodiment of the present invention.
Figure 6:
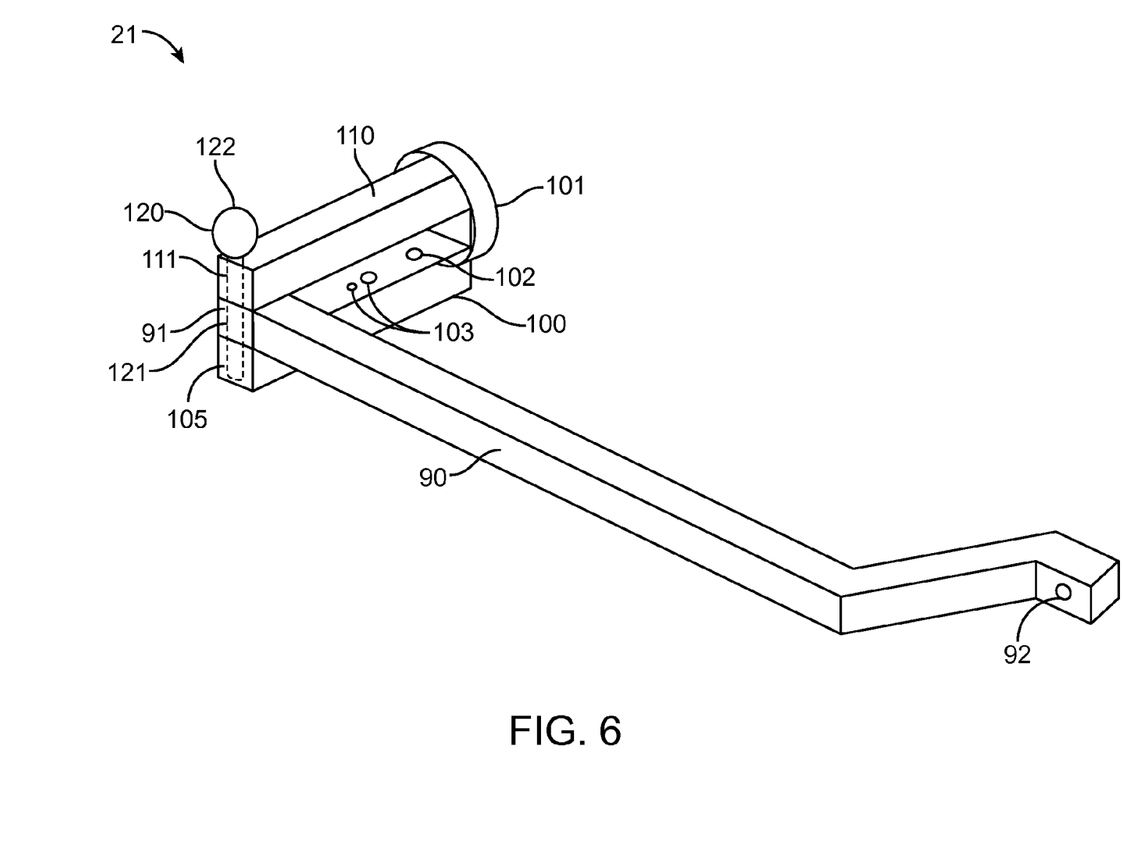
FIG. 6 is a perspective view of the slave unit 21 of the bicycle tow hitch 10, according to a preferred embodiment of the present invention; and, FIG. 7 is a perspective view of the bicycle tow hitch 10, according to a preferred embodiment of the present invention.

Referring now to FIGS. 5 and 6, a perspective view of the slave unit 21 of the apparatus 10 both installed on the slave bicycle 150 and without the slave bicycle 150, according to the preferred embodiment of the present invention, are disclosed. The lower fork clamp bar 100 is adapted to be inserted through the front wheel 151 and behind the wheel fork 153 so that the loop receptacle 101 is on the left side of the slave bicycle 150. The upper fork clamp bar 110 is adapted to be inserted through the front wheel 151 in front of the wheel fork 153 and secured by the loop receptacle 101. The threaded end 121 of the fork clamp retaining bolt 120 attaches the upper fork clamp aperture 111, the right fork upper aperture 91, and the lower fork clamp right receptacle 105 in that order.

Figure 7:
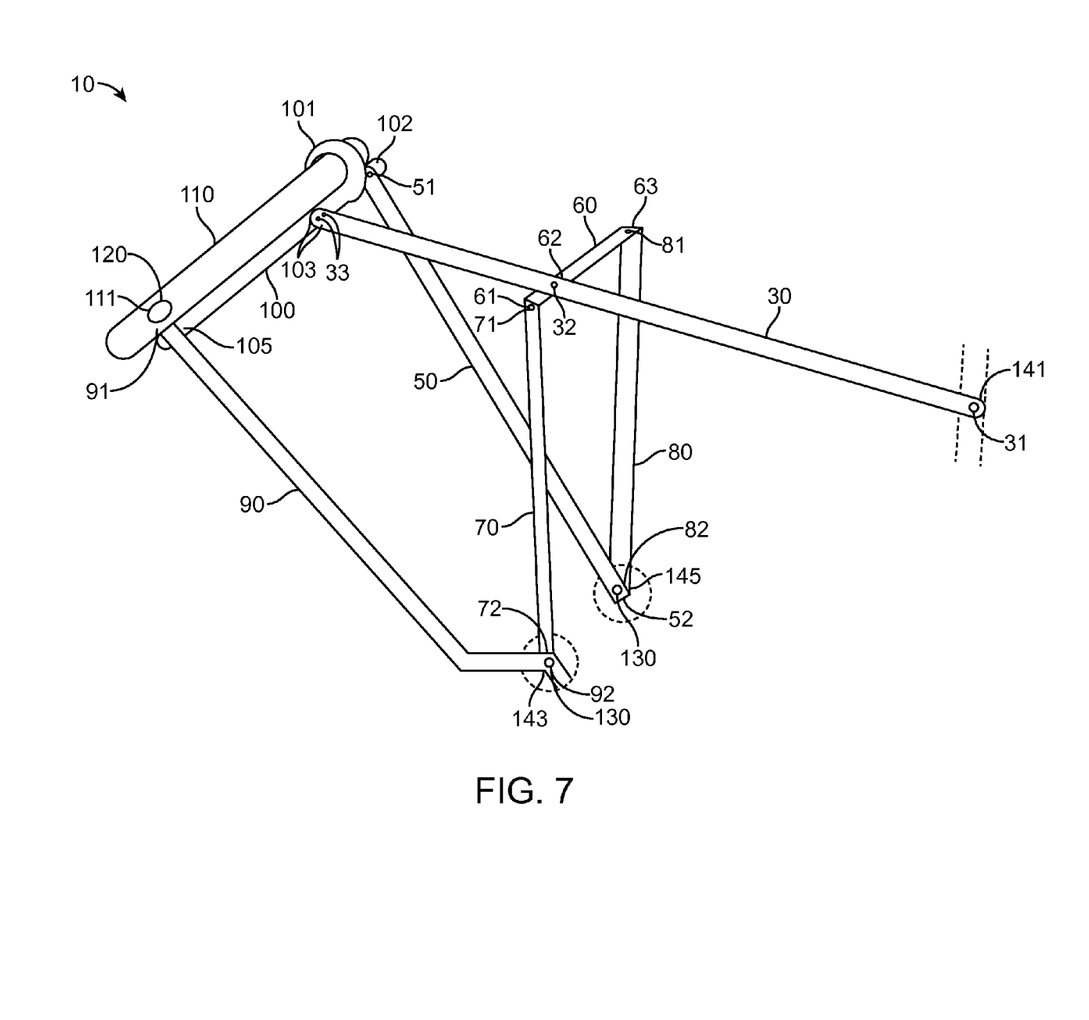

Referring now to FIG. 7, a perspective view of the apparatus 10, according to the preferred embodiment of the present invention, is disclosed. A bolt 130 connects the right fork lower aperture 92, the right upright lower aperture 72, and the right receptacle 143 in that order. The left fork upper aperture 51 attaches to the lower fork clamp left aperture 102 with a bolt 130. The central frame rear apertures 33 attach to the lower fork clamp central apertures 103 with two (2) bolts 130.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 7.

The method of installing and utilizing the apparatus 10 may be achieved by performing the following steps: procuring the apparatus 10; installing the lower fork clamp bar 100 into the front wheel 151 of the slave bicycle 150 behind the wheel fork 153; installing the upper fork clamp bar 110 into the front wheel 151 of the slave bicycle 150 in front of the wheel fork 153 and into the loop receptacle 101 of the lower fork clamp bar 100; positioning the right fork support bar 90 in front of the lower fork clamp bar 100 and behind the upper fork clamp bar 110; installing the threaded end 121 of the fork clamp retaining bolt 120 into the upper fork clamp aperture 111, the right fork upper aperture 91, and the lower fork clamp right aperture 105 in that order; attaching the central frame front aperture 31 to the seat post aperture 141 with a bolt 130; attaching the central frame central aperture 32 to the central upright central aperture 62 with a bolt 130; attaching the central frame rear apertures 33 to the lower fork clamp central apertures 103 with two (2) bolts 130; attaching the right upright upper aperture 71 to the central upright right aperture 61 with a bolt 130; attaching the left upright upper aperture 81 to the central upright left aperture 63 with a bolt 130; attaching the left fork upper aperture 51 to the lower fork clamp left aperture 102 with a bolt; attaching the left fork lower aperture 52, the left upright lower aperture 82, and the left receptacle 145 with a bolt 130 so that the left fork bar 50 is on the outside of the left upright bar 80; attaching the right fork lower aperture 92, the right upright lower aperture 72, and the right receptacle 143 with a bolt 130 so that the right fork bar 90 is on the outside of the right upright bar 70; and, securely and safely towing the slave bicycle 150 with the master bicycle 140 while using the bicycle tow hitch 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A bicycle tow hitch for enabling a master bicycle to securely tow a slave bicycle, said bicycle tow hitch comprising:
   a master unit adapted to be attached to the master bicycle, comprising:
      a central frame support bar including:
         a central frame front aperture;
         a central frame central aperture; and,
         a plurality of central frame rear apertures;
      a left fork support bar including:
         a left fork upper aperture; and,
         a left fork lower aperture;
      a central upright bar including:
         a central upright right aperture;
         a central upright central aperture; and,
         a central upright left aperture;
      a right upright bar including:
         a right upright upper aperture; and,
         a right upright lower aperture; and,
      a left upright bar including:
         a left upright upper aperture; and,
         a left upright lower aperture;
   a slave unit attached to said master unit, said slave unit adapted to be attached to the slave bicycle and comprising:
      a right fork support bar capable of receiving a front wheel of the slave bicycle;
      a lower fork clamp bar including:
         a loop receptacle;
         a lower fork clamp left aperture;
         a plurality of lower fork clamp central apertures; and,
         a lower fork clamp right aperture;
      an upper fork clamp bar including an upper fork clamp aperture; and,
      a fork clamp retaining bolt including:
         a threaded end; and,
         a handle; and,
   wherein said slave unit remains statically anchored to said master unit during transport of the slave bicycle.

2. The bicycle tow hitch of claim 1, wherein said right fork support bar comprises a body including:
   a first section having a right fork upper aperture;
   a second section angled toward a first side extending from an end of said first section; and,
   a third section having a right fork lower aperture, said third section extending outwardly from an end of said second section generally parallel to said first section.

3. The bicycle tow hitch of claim 2, wherein said central frame front aperture of said central frame support bar is adapted to attach to a seat post aperture of the master bicycle.

4. The bicycle tow hitch of claim 3, wherein said central frame central aperture attaches to said central upright central aperture;
  wherein said right upright lower aperture is removably connected to said right fork lower aperture and said right receptacle.

5. The bicycle tow hitch of claim 4, wherein said right upright upper aperture is attached to said central upright right aperture;
  wherein said left upright upper aperture is attached said central upright left aperture; and,
  wherein said left upright lower aperture is removably connected to said left fork lower aperture and said left receptacle.

6. The bicycle tow hitch of claim 5, wherein said lower fork clamp bar is adapted to be inserted through the front wheel and behind a wheel fork of the slave bicycle so that said loop receptacle is adapted to be positioned on a left side of the slave bicycle;
  wherein said upper fork clamp bar is adapted to be inserted through said front wheel in front of the wheel fork of the slave bicycle and secured by said loop receptacle; and,
  wherein said threaded end of said fork clamp retaining bolt is attaches said right fork upper aperture to said upper fork clamp aperture and said lower fork clamp right receptacle.

7. The bicycle tow hitch of claim 6, wherein said right upright lower aperture is removably connected to said right fork lower aperture and said right receptacle;
  wherein said left fork upper aperture is attached to said lower fork clamp left aperture; and,
  wherein said central frame rear apertures are attached to said lower fork clamp central apertures, respectively.

8. A bicycle tow hitch for enabling a master bicycle to securely tow a slave bicycle, said bicycle tow hitch comprising:
  a master unit adapted to be removably attached to the master bicycle, comprising:
    a central frame support bar including:
      a central frame front aperture;
      a central frame central aperture; and,
      a plurality of central frame rear apertures;
    a left fork support bar including:
      a left fork upper aperture; and,
      a left fork lower aperture;
    a central upright bar including:
      a central upright right aperture;
      a central upright central aperture; and,
      a central upright left aperture;
    a right upright bar including:
      a right upright upper aperture; and,
      a right upright lower aperture; and,
    a left upright bar including:
      a left upright upper aperture; and,
      a left upright lower aperture;
  a slave unit removably attached to said master unit, said slave unit adapted to be removably attached to the slave bicycle and comprises:
    a right fork support bar capable of receiving a front wheel of the slave bicycle;
    a lower fork clamp bar including:
      a loop receptacle;
      a lower fork clamp left aperture;
      a plurality of lower fork clamp central apertures; and,
      a lower fork clamp right aperture;
    an upper fork clamp bar including an upper fork clamp aperture; and,
    a fork clamp retaining bolt including:
      a threaded end; and,
      a handle; and,
  wherein said slave unit remains statically anchored to said master unit during transport of the slave bicycle.

9. The bicycle tow hitch of claim 8, wherein said right fork support bar comprises a body including:
  a first section having a right fork upper aperture;
  a second section angled toward a first side extending from an end of said first section; and,
  a third section having a right fork lower aperture, said third section extending outwardly from an end of said second section generally parallel to said first section.

10. The bicycle tow hitch of claim 9, wherein said central frame front aperture of said central frame support bar is adapted to attach to a seat post aperture of the master bicycle.

11. The bicycle tow hitch of claim 10, wherein said central frame central aperture attaches to said central upright central aperture;
  wherein said right upright lower aperture is removably connected to said right fork lower aperture and said right receptacle.

12. The bicycle tow hitch of claim 11, wherein said right upright upper aperture is attached to said central upright right aperture;
  wherein said left upright upper aperture is attached said central upright left aperture; and,
  wherein said left upright lower aperture is removably connected to said left fork lower aperture and said left receptacle.

13. The bicycle tow hitch of claim 12, wherein said lower fork clamp bar is adapted to be inserted through the front wheel and behind a wheel fork of the slave bicycle so that said loop receptacle is adapted to be positioned on a left side of the slave bicycle;
  wherein said upper fork clamp bar is adapted to be inserted through said front wheel in front of the wheel fork of the slave bicycle and secured by said loop receptacle; and,
  wherein said threaded end of said fork clamp retaining bolt is attaches said right fork upper aperture to said upper fork clamp aperture and said lower fork clamp right receptacle.

14. The bicycle tow hitch of claim 13, wherein said right upright lower aperture is removably connected to said right fork lower aperture and said right receptacle;
  wherein said left fork upper aperture is attached to said lower fork clamp left aperture; and,
  wherein said central frame rear apertures are attached to said lower fork clamp central apertures, respectively.

* * * * *